(12) United States Patent
Nakamura et al.

(10) Patent No.: US 12,141,776 B2
(45) Date of Patent: *Nov. 12, 2024

(54) ARTICLE DEDUCTION APPARATUS, ARTICLE DEDUCTION METHOD, AND PROGRAM

(71) Applicant: NEC Corporation, Tokyo (JP)

(72) Inventors: Motoyuki Nakamura, Tokyo (JP); Hisayoshi Mura, Tokyo (JP); Shinya Yamasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,583

(22) Filed: Aug. 8, 2023

(65) Prior Publication Data

US 2023/0385798 A1 Nov. 30, 2023

Related U.S. Application Data

(63) Continuation of application No. 17/434,813, filed as application No. PCT/JP2020/006860 on Feb. 20, 2020, now Pat. No. 11,922,391.

(30) Foreign Application Priority Data

Mar. 1, 2019 (JP) ................................. 2019-037829

(51) Int. Cl.
*G06Q 20/20* (2012.01)
*A47F 10/00* (2006.01)
(Continued)

(52) U.S. Cl.
CPC .......... *G06Q 20/208* (2013.01); *A47F 10/00* (2013.01); *G01G 19/52* (2013.01); *G01S 17/08* (2013.01);
(Continued)

(58) Field of Classification Search
CPC .... G06Q 20/208; G06Q 30/06; G06Q 20/203; A47F 10/00; A47F 10/02; G01G 19/52;
(Continued)

(56) References Cited

U.S. PATENT DOCUMENTS 9,911,290 B1 * 3/2018 Zalewski ............... G06Q 20/12
10,078,003 B2 * 9/2018 Gurumohan ......... G06Q 10/087
(Continued)

FOREIGN PATENT DOCUMENTS

JP 2014-194732 A 10/2014
JP 2017-210310 A 11/2017
(Continued)

OTHER PUBLICATIONS

JP Office Communication for JP Application No. 2021-503960, mailed on Jan. 9, 2024 with English Translation.
(Continued)

*Primary Examiner* — Michael Jared Walker
(74) *Attorney, Agent, or Firm* — Sughrue Mion, PLLC

(57) ABSTRACT

An article information deduction apparatus (10) includes an acquisition unit (110) and an output unit (120). The acquisition unit (110) acquires data based on a change in a detected value of a weight sensor (30) (hereinafter described as weight change data). For example, the acquisition unit (110) determines data acquired by chronologically arranging data acquired from the weight sensor (30) as weight change data. Further, the acquisition unit (110) acquires data indicating a movement of a hand of a person positioned in a shelf-front space (hereinafter described as movement data). For example, the acquisition unit (110) acquires data acquired by chronologically arranging data output from a depth sensor (40) to the article information deduction apparatus (10) as movement data. The output unit (120) outputs article determination information of the article deduced to be
(Continued)

taken out by the hand of the person positioned in the shelf-front space, by using the weight change data and the movement data.

20 Claims, 13 Drawing Sheets

(51) Int. Cl.
*G01G 19/52* (2006.01)
*G01S 17/08* (2006.01)
*G06Q 30/06* (2023.01)
*G06T 7/20* (2017.01)
*G06T 7/50* (2017.01)
*G06T 7/70* (2017.01)
*G06V 20/52* (2022.01)
*G06V 40/10* (2022.01)
*G06V 40/20* (2022.01)

(52) U.S. Cl.
CPC .............. *G06Q 30/06* (2013.01); *G06T 7/20* (2013.01); *G06T 7/50* (2017.01); *G06T 7/70* (2017.01); *G06V 20/52* (2022.01); *G06V 40/10* (2022.01); *G06V 40/20* (2022.01); *G06T 2207/30196* (2013.01); *G06T 2207/30232* (2013.01)

(58) Field of Classification Search
CPC ........... G01G 19/42; G01S 17/08; G06T 7/20; G06T 7/50; G06T 7/70; G06T 2207/30196; G06T 2207/30232; G06V 20/52; G06V 40/10; G06V 40/20; G06V 40/16; G06V 40/172; G07G 1/0063; G07G 1/0072; G07G 1/14; B65G 1/137
See application file for complete search history.

(56) References Cited

U.S. PATENT DOCUMENTS

| | | | |
|---|---|---|---|
| 10,198,710 B1* | 2/2019 | Hahn | G01G 19/4144 |
| 10,282,852 B1* | 5/2019 | Buibas | G06T 7/246 |
| 10,318,569 B1* | 6/2019 | Funk | G06Q 20/3278 |
| 10,339,656 B1* | 7/2019 | Le | G06T 7/50 |
| 10,430,798 B2* | 10/2019 | Volpi | G06Q 30/02 |
| 10,516,982 B2* | 12/2019 | Jiang | H04W 4/023 |
| 10,805,556 B1* | 10/2020 | Sorgi | G06F 18/00 |
| 10,861,086 B2* | 12/2020 | Glaser | G06Q 20/203 |
| 10,885,336 B1* | 1/2021 | Davis | G11B 20/00289 |
| 10,963,704 B2* | 3/2021 | Glaser | G07G 1/0036 |
| 11,030,442 B1* | 6/2021 | Bergamo | G06F 18/214 |
| 11,085,809 B1* | 8/2021 | Franklin | G01G 3/1402 |
| 11,132,658 B2* | 9/2021 | Hara | G06Q 20/4014 |
| 11,284,041 B1* | 3/2022 | Bergamo | G06T 7/251 |
| 11,301,984 B1* | 4/2022 | Kumar | G06T 7/0008 |
| 11,468,681 B1* | 10/2022 | Kumar | G06V 40/10 |
| 2014/0179231 A1* | 6/2014 | Charania | G07F 9/001 455/517 |
| 2014/0249971 A1* | 9/2014 | Susaki | G06Q 20/32 705/30 |
| 2015/0012396 A1* | 1/2015 | Puerini | G06V 20/52 705/28 |
| 2015/0039458 A1* | 2/2015 | Reid | A61B 5/117 705/26.1 |
| 2015/0169961 A1* | 6/2015 | Ito | G06T 7/521 382/103 |
| 2015/0213498 A1* | 7/2015 | Ito | G06Q 30/0261 705/14.58 |
| 2016/0203431 A1* | 7/2016 | Renfroe | G06Q 30/0207 705/7.25 |
| 2017/0256148 A1* | 9/2017 | King | G08B 13/196 |
| 2018/0107970 A1* | 4/2018 | Jones | G01G 19/52 |
| 2018/0139570 A1* | 5/2018 | Calvarese | H04W 4/021 |
| 2019/0007381 A1* | 1/2019 | Isaacson | G06Q 20/12 |
| 2019/0087663 A1* | 3/2019 | Yamazaki | G06V 20/52 |
| 2019/0088096 A1* | 3/2019 | King | G08B 13/19665 |
| 2019/0147446 A1* | 5/2019 | Varma | G06Q 20/409 705/28 |
| 2019/0149725 A1* | 5/2019 | Adato | H04N 1/00 348/158 |
| 2019/0281030 A1* | 9/2019 | Isaacson | H04L 63/0838 |
| 2019/0392189 A1* | 12/2019 | Kumar | G06V 10/143 |
| 2019/0392220 A1* | 12/2019 | Maan | G06Q 20/202 |
| 2020/0410275 A1* | 12/2020 | Higa | G06V 40/20 |
| 2021/0004606 A1* | 1/2021 | Se | G01S 5/0264 |

FOREIGN PATENT DOCUMENTS

| | | |
|---|---|---|
| JP | 2017-218289 A | 12/2017 |
| JP | 2018-160107 A | 10/2018 |
| JP | 2018-206372 A | 12/2018 |
| WO | 2017/163909 A1 | 9/2017 |

OTHER PUBLICATIONS

International Search Report for PCT Application No. PCT/JP2020/006860, mailed on Apr. 21, 2020.

* cited by examiner

| | |
|---|---|
| SHELF POSITION INFORMATION | . . . . |
| WEIGHT SENSOR IDENTIFICATION INFORMATION | . . . . |
| ARTICLE DETERMINATION INFORMATION | . . . . |
| THRESHOLD VALUE INFORMATION (WEIGHT OF ARTICLE) | . . . . |

ARTICLE DEDUCTION APPARATUS, ARTICLE DEDUCTION METHOD, AND PROGRAM

CROSS-REFERENCE TO RELATED APPLICATIONS

The present application is a continuation application of U.S. patent application Ser. No. 17/434,813 filed on Aug. 30, 2021, which is a National Stage Entry of international application PCT/JP2020/006860 filed on Feb. 20, 2020, which claims the benefit of priority from Japanese Patent Application 2019-037829 filed on Mar. 1, 2019, the disclosures of all of which are incorporated in their entirety by reference herein.

TECHNICAL FIELD

The present invention relates to an article deduction apparatus, an article deduction method, and a program.

BACKGROUND ART

In recent years, technological development for reduction of labor at a store, a factory, and the like is under way. For example, PTL 1 describes, in work of boxing a plurality of types of articles taken out from an inventory shelf as one set, measuring the total weight of articles 5 stored in the inventory shelf and determining whether to issue a warning by using the measurement result.

Further, PTL 2 describes, in order to manage handling of articles, generating inventory data by using a result of processing a captured image of a bar code or a QR code (registered trademark) of an article. Inventory data are information indicating handling status of an article and, for example, are information correlating identification information of an article an image of which is captured, a date and time when checking of the article is performed, a location where the article is installed, and identification information of a user handling the article with one another.

CITATION LIST

Patent Literature

PTL 1: Japanese Patent Application Publication No. 2017-218289
PTL 2: Japanese Patent Application Publication No. 2017-210310

SUMMARY OF INVENTION

Technical Problem

In order to promote reduction of labor, it is preferable to enable automatic determination of an article taken out from a shelf. An object of the present invention is to improve determination precision of an article taken out from a shelf.

Solution to Problem

The present invention provides an article deduction apparatus including:
an acquisition unit that acquires weight change data being data based on a change in a detected value of a weight sensor provided on a shelf on which a plurality of articles can be placed and movement data indicating a movement of a hand of a person positioned in a shelf-front space being a space in front of the shelf; and
an output unit that outputs article determination information of the article deduced to be taken out by the hand, by using the weight change data and the movement data.

The present invention provides an article deduction method including, by a computer:
acquiring weight change data being data based on a change in a detected value of a weight sensor provided on a shelf on which a plurality of articles can be placed and movement data indicating a movement of a hand of a person positioned in a shelf-front space being a space in front of the shelf; and
outputting article determination information of the article deduced to be taken out by the hand, by using the weight change data and the movement data.

The present invention provides a program causing a computer to have:
a function of acquiring weight change data being data based on a change in a detected value of a weight sensor provided on a shelf on which a plurality of articles can be placed and movement data indicating a movement of a hand of a person positioned in a shelf-front space being a space in front of the shelf; and
a function of outputting article determination information of the article deduced to be taken out by the hand, by using the weight change data and the movement data.

Advantageous Effects of Invention

The present invention improves determination precision of an article taken out from a shelf.

BRIEF DESCRIPTION OF DRAWINGS

The aforementioned object, other objects, features and advantages will become more apparent by the following preferred example embodiments and accompanying drawings.

FIG. 2 is a diagram illustrating an example of data stored by a shelf space allocation information storage unit.

EXAMPLE EMBODIMENT

Example embodiments of the present invention will be described below by using drawings. Note that, in every drawing, similar components are given similar signs, and description thereof is omitted as appropriate.

First Example Embodiment

Figure 1:
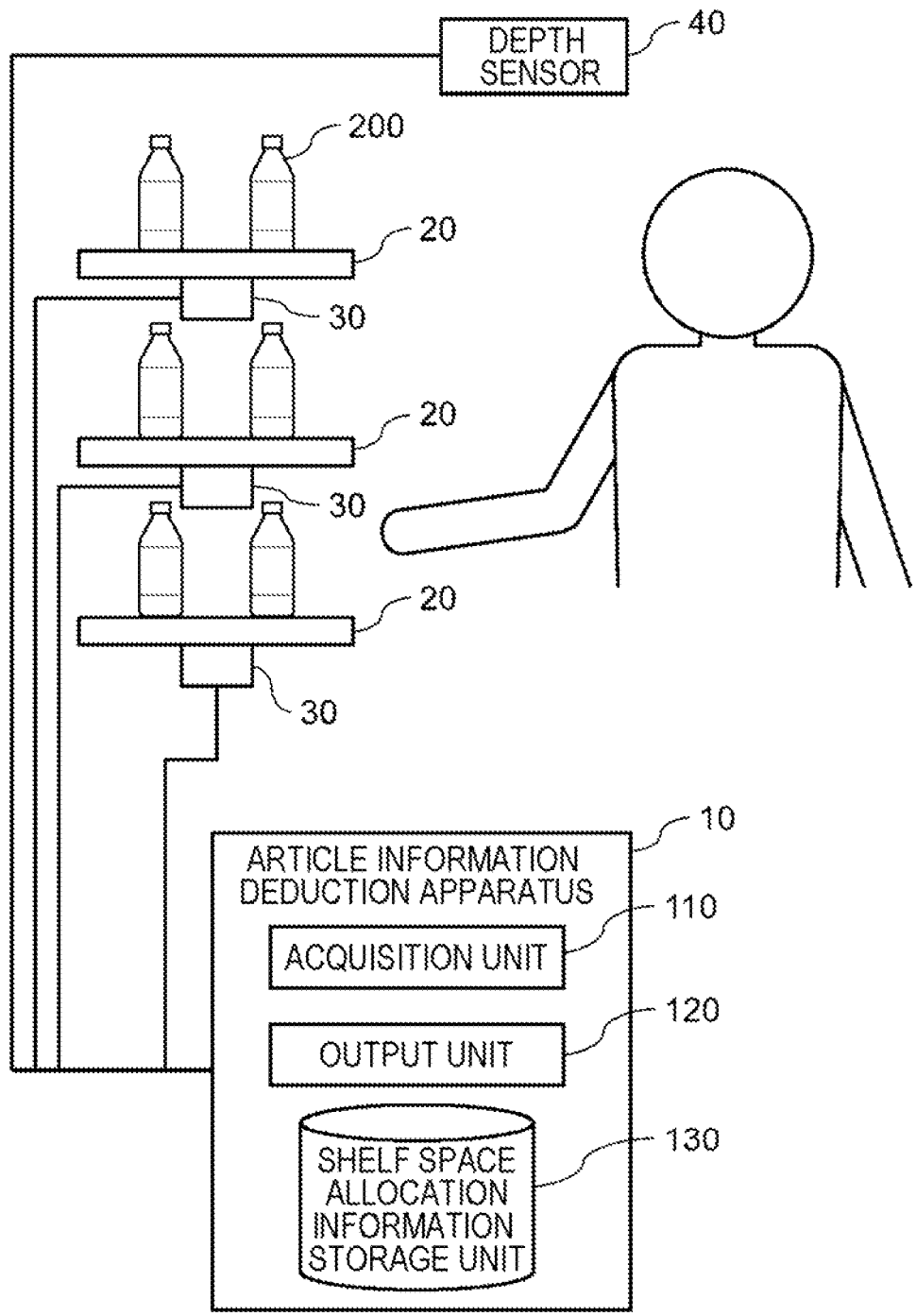
FIG. 1 is a diagram illustrating a functional configuration of an article information deduction apparatus according to a first example embodiment along with a use environment of the article information deduction apparatus.

FIG. 1 is a diagram illustrating a functional configuration of an article information deduction apparatus 10 according to a first example embodiment along with a use environment of the article information deduction apparatus 10. The article information deduction apparatus according to the example embodiment is an apparatus deducing an article 200 taken out from a shelf 20 by a person and is used along with a weight sensor 30 and a depth sensor 40. The shelves 20 in the diagram are illustrated in a state of being viewed from the side.

A plurality of articles 200 can be placed on a shelf 20. For example, when a shelf 20 is placed in a store or a distribution center, the shelf 20 is a product shelf, an article 200 is a product, and a person taking out an article 200 is a customer or a clerk (employee). Further, when a shelf 20 is placed in a pharmacy, the shelf 20 is a medicine shelf, an article 200 is a medicine, and a person taking out an article 200 is a pharmacist.

According to the present example embodiment, an article 200 is placed on each of a plurality of tiers of shelves 20. A plurality of types of articles 200 are placed on the plurality of tiers of shelves 20. Then, for each article 200, a shelf 20 on which the article 200 is placed is predetermined. Therefore, when a shelf 20 from which an article 200 is taken out is identified, the type of the article 200 can be deduced. Note that there may be one shelf 20.

A detection range of the depth sensor 40 includes a space in front of shelves 20 (hereinafter described as a shelf-front space), and the depth sensor 40 generates data indicating a movement of a hand of a person positioned in the shelf-front space. For example, the depth sensor 40 is placed above the shelf-front space but may be placed on side of the shelf-front space or may be placed below the shelf-front space. Then, the depth sensor 40 generates data indicating the position of the hand in an x-y plane (that is, a horizontal plane) and the position of the hand in a z-direction (that is, a height direction) and outputs the data to the article information deduction apparatus 10. Therefore, when a person puts a hand into a shelf 20, the article information deduction apparatus 10 can determine the shelf 20 by using data generated by the depth sensor 40. For example, a stereo camera may be used in the depth sensor 40 or light detection and ranging (LiDAR) may be used. Further, the article information deduction apparatus 10 may generate data indicating the position of a hand by processing output data from the depth sensor 40.

Further, an article 200 taken out from a shelf 20 can be deduced by detecting decrease in the total weight of articles placed on the shelf 20 by a reference value or greater, that is, decrease in the weight of the shelf 20 by the reference value or greater. Specifically, a weight sensor 30 detects the total weight of a shelf 20. The detected value of the weight sensor 30 is output to the article information deduction apparatus 10 along with weight sensor identification information assigned to the weight sensor 30. Then, by using the weight sensor identification information, the article information deduction apparatus 10 can deduce the type of the article 200 being taken out.

Functional Configuration Example

The article information deduction apparatus 10 includes an acquisition unit 110 and an output unit 120.

The acquisition unit 110 acquires data based on changes in the detected value of the weight sensor 30 (hereinafter described as weight change data). For example, the acquisition unit 110 generates weight change data by chronologically arranging data acquired from a weight sensor 30. Note that a data processing apparatus generating weight change data by using data generated by a weight sensor 30 may be provided outside the article information deduction apparatus 10. In this case, the acquisition unit 110 acquires weight change data from the data processing apparatus.

Further, the acquisition unit 110 acquires data indicating a movement of a hand of a person positioned in a shelf-front space (hereinafter described as movement data). For example, the acquisition unit 110 generates movement data by chronologically arranging data output from the depth sensor 40 to the article information deduction apparatus 10.

The output unit 120 outputs article determination information of an article deduced to be taken out by a hand of a person positioned in a shelf-front space by using weight change data and movement data. The article information deduction apparatus 10 according to the present example embodiment includes a shelf space allocation information storage unit 130. For each shelf 20, the shelf space allocation information storage unit 130 stores article determination information for determining an article placed in the shelf 20. For example, the output unit 120 determines a shelf 20 on which a product being taken out is placed, reads article determination information related to the determined shelf 20 from the shelf space allocation information storage unit 130, and outputs the read article determination information. For example, article determination information is an ID (or may be code information) assigned to an article or a name of the article (such as a product name).

FIG. 2 is a diagram illustrating an example of data stored by the shelf space allocation information storage unit 130. For each piece of information indicating the position of a shelf 20 (hereinafter described as shelf position information), the shelf space allocation information storage unit 130 according to the present example embodiment stores weight sensor identification information of a weight sensor 30 installed on the shelf 20, article determination information of an article 200 placed at the position, and threshold value information. The shelf position information includes information for determining the height of the shelf 20 (such as the height from the floor or the number of tiers from the bottom). The threshold value information is a value assumed to be a decrement of the detected value of the weight sensor 30 when an article 200 is taken out from the shelf and, for example, set to a value equal to or greater than 90% and equal to or less than 110% of the weight of the article 200.

A threshold value indicated by the threshold value information is used by the output unit 120, as will be described later.

Hardware Configuration Example

Figure 3:
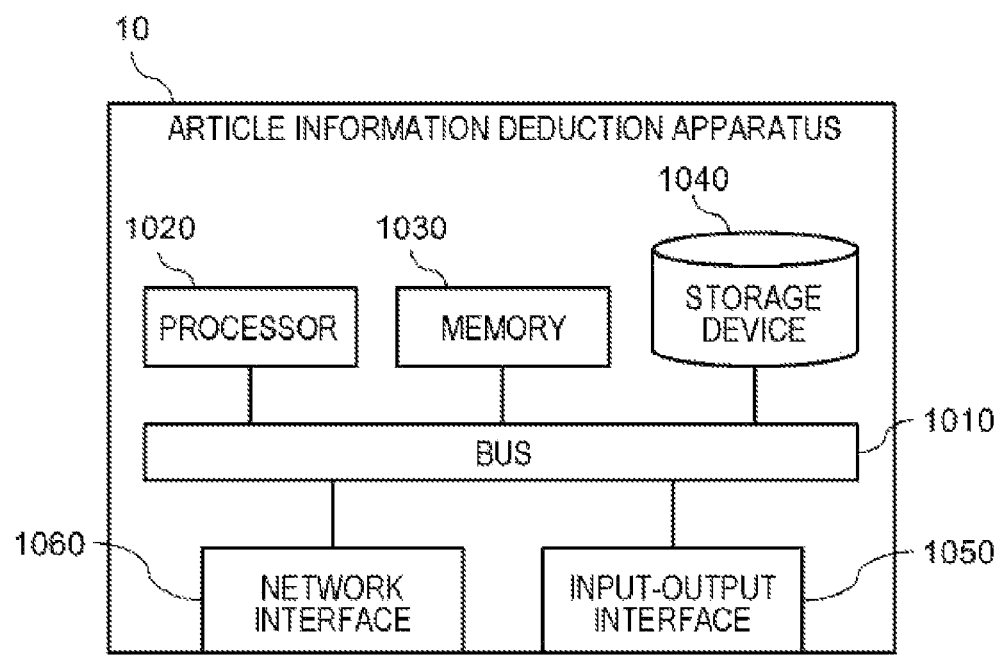
FIG. 3 is a block diagram illustrating a hardware configuration of the article information deduction apparatus illustrated in FIG. 1.

FIG. 3 is a block diagram illustrating a hardware configuration of the article information deduction apparatus 10 illustrated in FIG. 1. The article information deduction apparatus 10 includes a bus 1010, a processor 1020, a memory 1030, a storage device 1040, an input-output interface 1050, and a network interface 1060.

The bus 1010 is a data transmission channel for the processor 1020, the memory 1030, the storage device 1040, the input-output interface 1050, and the network interface 1060 to transmit and receive data to and from one another. Note that the method of interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules providing functions of the article information deduction apparatus 10 (such as the acquisition unit 110 and the output unit 120). By the processor 1020 reading each program module into the memory 1030 and executing the program module, each function related to the program module is provided.

The input-output interface 1050 is an interface for connecting the article information deduction apparatus 10 to various types of input-output equipment.

The network interface 1060 is an interface for connecting the article information deduction apparatus 10 to a network. For example, the network is a local area network (LAN) or a wide area network (WAN). The method of connecting the network interface 1060 to the network may be a wireless connection or a wired connection.

Then, the article information deduction apparatus 10 is connected to required equipment (for example, sensors such as a weight sensor 30 and the depth sensor 40) through the input-output interface 1050 or the network interface 1060.

Operation Example

Figure 4:
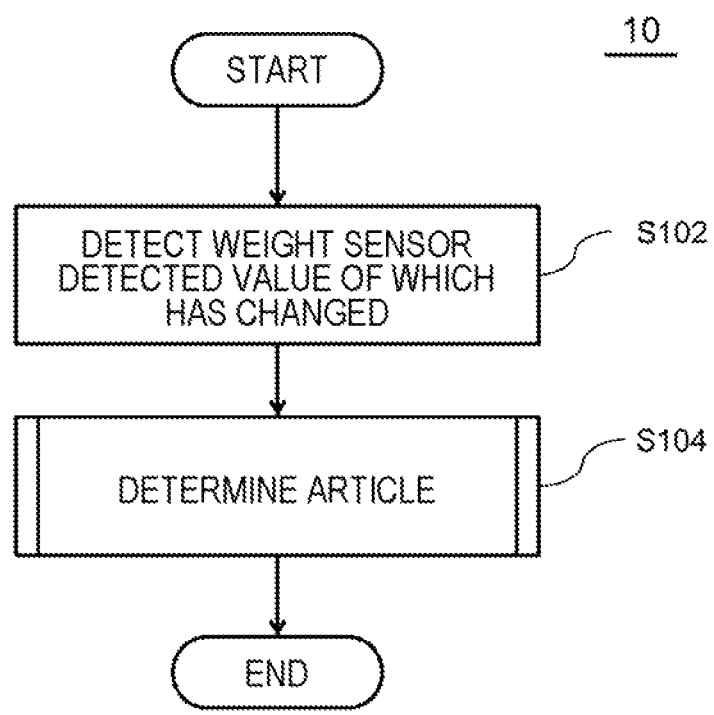
FIG. 4 is a flowchart for illustrating an operation example of the article information deduction apparatus.

FIG. 4 is a flowchart for illustrating an operation example of the article information deduction apparatus 10. In the example illustrated in the diagram, a weight sensor 30 always continues transmitting data and weight sensor identification information to the article information deduction apparatus 10. Further, the depth sensor 40 also always continues transmitting data to the article information deduction apparatus 10. The acquisition unit 110 continues acquiring the data, that is, weight change data and movement data. Further, the acquisition unit 110 continues causing a storage to store acquired data as needed.

The output unit 120 analyzes the detected values of weight sensors 30 acquired by the acquisition unit 110 and determines weight sensor identification information of a weight sensor the detected value (that is, the weight) of which has decreased by a reference value or greater (Step S102). For example, the reference value is stored in the shelf space allocation information storage unit 130 as illustrated in FIG. 2. Then, the output unit 120 performs determination processing of an article by using the weight sensor identification information determined in Step S102 and the detected value of the depth sensor 40 (Step S104).

Figure 5:
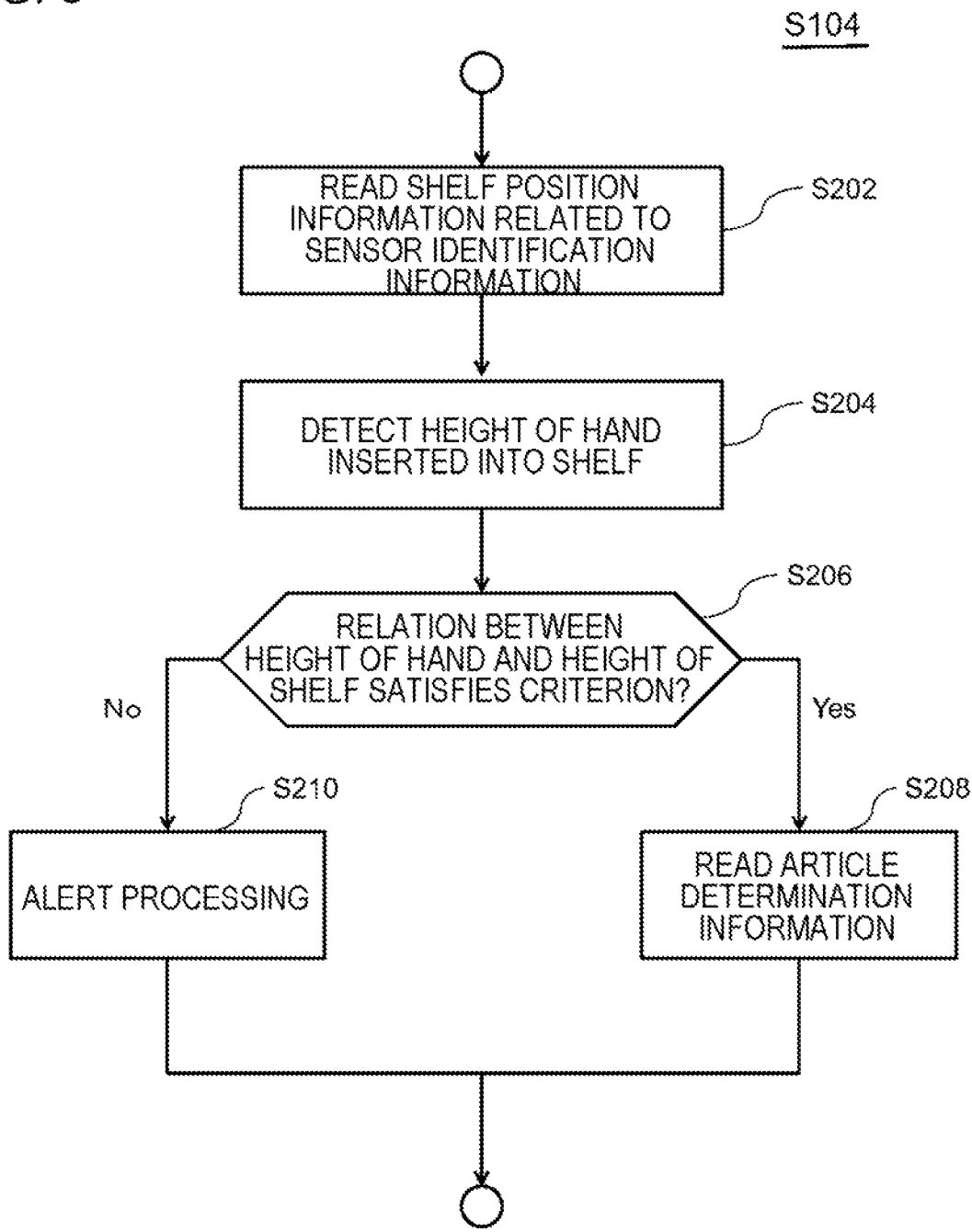
FIG. 5 is a flowchart for illustrating details of processing performed in Step S104.

FIG. 5 is a flowchart for illustrating details of the processing performed in Step S104. First, the output unit 120 reads shelf position information related to the weight sensor identification information determined in Step S102 from the shelf space allocation information storage unit 130 (Step S202). Next, the output unit 120 analyzes the data output by the depth sensor 40 and detects the height of a hand inserted into a shelf 20 (Step S204).

Next, the output unit 120 determines whether a relation between the height of the hand detected in Step S204 and the shelf position information read in Step S202 satisfies a criterion (Step S206). For example, when the height of the hand detected in Step S204 is between the height indicated by the shelf position information and the height of a shelf 20 above the shelf, the output unit 120 determines that the criterion is satisfied. Note that the criterion may be stored in the shelf space allocation information storage unit 130 for each shelf 20. In this case, the output unit 120 reads and uses a criterion associated with the shelf position information determined in Step S102. Further, the shelf space allocation information storage unit 130 may store a range within which the height of a hand inserted into the shelf 20 may fall, in place of the shelf position information. In this case, the output unit 120 determines whether a height newly acquired by the depth sensor 40 falls within the range.

When the relation between the height of the hand and the shelf position information satisfies the criterion (Step S206: Yes), the output unit 120 deduces the article 200 taken out by the person, by reading article determination information related to the weight sensor identification information determined in Step S102 from the shelf space allocation information storage unit 130 (Step S208). Then, the output unit 120 outputs the read article determination information.

On the other hand, when the relation between the height of the hand and the shelf position information does not satisfy the criterion (Step S206: No), the output unit 120 performs alert processing. For example, the alert processing refers to displaying a predetermined screen on a terminal of a person in charge of the article 200 (such as a clerk when the shelf 20 is in a store) (Step S210). Note that data generated by the depth sensor 40, and/or an image captured by a first image capture unit 70 and/or an image captured by a second image capture unit 80 described in example embodiments to be described later may be transmitted to the terminal of the person in charge, along with the alert processing or in place of the alert processing. In this case, the person in charge may deduce the article 200 being taken out by checking the image or the like and transmit the result to the output unit 120 through the terminal.

Note that the output unit 120 according to the present example embodiment may first detect that the position of a hand is a height related to one of the shelves 20 and read article determination information related to the shelf 20 when a weight change of the shelf 20 subsequently satisfies the criterion.

Modified Example 1

Figure 6:
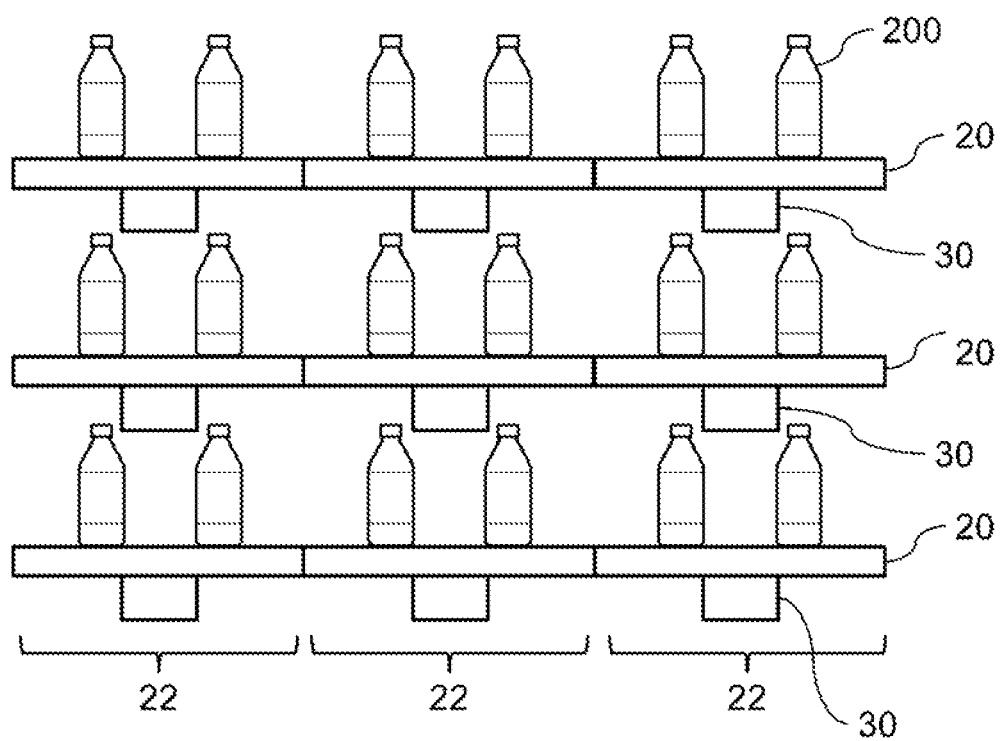
FIG. 6 is a diagram illustrating a layout example of shelves and weight sensors according to a modified example.

FIG. 6 is a diagram illustrating a layout example of shelves 20 and weight sensors 30, according to a modified example. In the diagram, the shelves 20 are illustrated in a state of being viewed from the front. In the example illustrated in the diagram, at least a shelf 20 in one tier includes a plurality of partial areas 22. An article 200 different from that in another partial area 22 is placed in at least one of the plurality of partial areas 22. A weight sensor 30 is provided for each partial area 22. Then, for each of the plurality of partial areas 22, the shelf space allocation information storage unit 130 stores the information illustrated in FIG. 2, that is, shelf position information, weight sensor identification information, article determination information, and threshold value information.

Further, a shelf-front space is set for each partial area 22, and a depth sensor 40 is also provided for each partial area 22. Each of a plurality of depth sensors 40 stores depth sensor identification information for distinguishing the depth sensor 40 from another depth sensor 40. Then, the depth sensor 40 transmits the depth sensor identification information to the article information deduction apparatus 10 along with data. For each piece of shelf position information, the shelf space allocation information storage unit 130 stores depth sensor identification information of a depth sensor 40 related to the shelf position. By using a combination of weight sensor identification information and depth sensor identification information stored in the shelf space allocation information storage unit 130, the article information deduction apparatus 10 determines a combination of data transmitted from a depth sensor 40 and data transmitted from a weight sensor 30.

Then, for each combination of data, in other words, on a per partial area 22 basis, the article information deduction apparatus 10 performs the processing illustrated in FIG. 4 and FIG. 5. The present modified example enables deduction of an article 200 taken out by a person even when a plurality of types of articles 200 are placed on shelves 20 at the same height.

As described above, when the position of a shelf 20 in which a weight change is detected and the height of a hand determined by the depth sensor 40 satisfy a criterion, an article 200 on the shelf 20 is determined to be taken out by the hand, according to the present example embodiment. Accordingly, determination precision of an article 200 taken out from a shelf 20 is improved.

Second Example Embodiment

Functional Configuration Example

Figure 7:
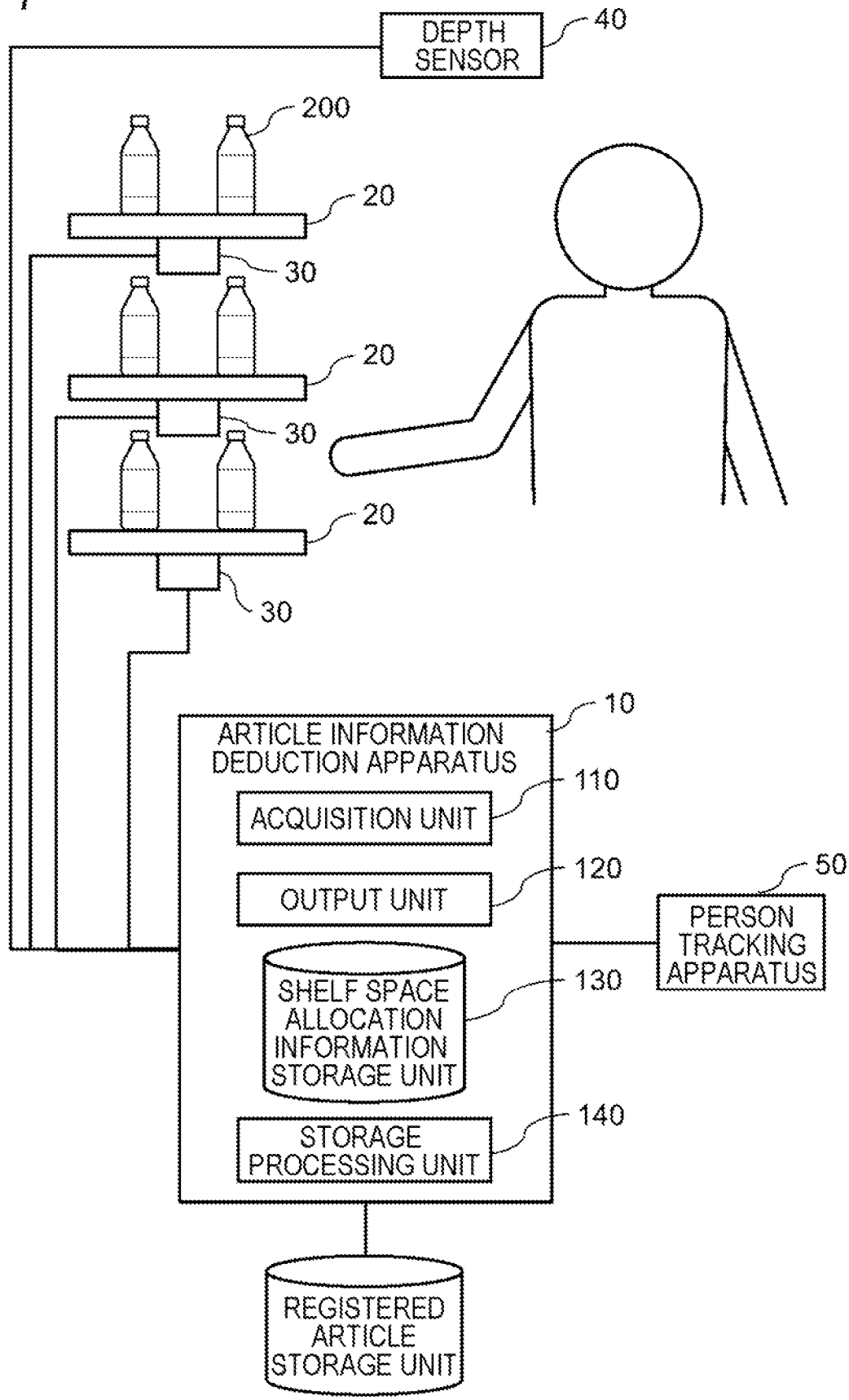
FIG. 7 is a diagram illustrating a functional configuration of an article information deduction apparatus according to a second example embodiment along with a use environment of the article information deduction apparatus.

FIG. 7 is a diagram illustrating a functional configuration of an article information deduction apparatus 10 according to the present example embodiment along with a use environment of the article information deduction apparatus 10 and corresponds to FIG. 1 in the first example embodiment. The article information deduction apparatus 10 according to the present example embodiment has a configuration similar to that of the article information deduction apparatus 10 according to the first example embodiment except for the following points.

First, the article information deduction apparatus 10 acquires person identification information of a person existing in a shelf-front space in front of shelves 20 from a person tracking apparatus 50.

For example, by analyzing images sent from a plurality of image capture units image capture ranges of which are locations different from one another, the person tracking apparatus generates, for each person, traffic line information indicating a traffic line of the person. Then, the person tracking apparatus 50 stores the traffic line information in association with person identification information. For example, person identification information is a feature value acquired from an image of a person. Further, when shelves 20 are installed in a store, person identification information may be a customer ID such as a membership number. Then, when a person stays in a shelf-front space in front of shelves 20 for a certain time, the person tracking apparatus 50 outputs person identification information of the person to the article information deduction apparatus 10.

Then, the article information deduction apparatus 10 includes a storage processing unit 140. The storage processing unit 140 causes a registered article storage unit 60 to store article determination information acquired by an output unit 120 in Step S208 in FIG. 5 in association with person identification information acquired from the person tracking apparatus 50.

For example, when shelves 20 are installed in a store, the article information deduction apparatus 10 and the registered article storage unit 60 can be used as a product registration apparatus in a point of sale system (POS) and/or a store server. Then, a checkout apparatus in the POS performs checkout processing by using information stored by the registered article storage unit 60.

For example, the person tracking apparatus 50 stores a feature value of the face of a customer entering the store. In this case, for example, the person tracking apparatus 50 acquires an image from an image capture apparatus an image capture range of which includes an entrance of the store and, by processing the image, acquires and stores a feature value of the face of the customer.

Then, as described above, the person tracking apparatus 50 generates traffic line information of the customer by using the feature value. Traffic line information is associated with a feature value or a customer ID associated with the feature value. Further, the storage processing unit 140 in the article information deduction apparatus 10 causes the registered article storage unit 60 to store article determination information of a product taken out by a customer in association with a feature value (or a customer ID associated with the feature value) of the customer. The processing is repeated until the customer performs checkout processing, and therefore when the customer takes out a plurality of products, the registered article storage unit stores article determination information of the plurality of products in association with the feature value (or the customer ID associated with the feature value) of the customer.

Further, by using a customer terminal, the customer can read information stored by the registered article storage unit 60. For example, the customer terminal transmits a feature value (or a customer ID) of the customer to the storage processing unit 140. The storage processing unit 140 reads article determination information associated with the transmitted feature value (or customer ID) from the registered article storage unit 60 and transmits the article determination information as a product list to the customer terminal. At this time, the article determination information may be converted into a product name by using a database. Further, the price of the product may be sent along with the article determination information (or product name). In the case of the latter, the total price of registered products may be further transmitted to the customer terminal.

Then, the customer terminal displays the transmitted product list. For example, the screen includes an input button for causing a checkout to be made.

Then, for example, by operating the customer terminal, the customer transmits information to the effect that a checkout of the product is to be made to the checkout apparatus along with the feature value (or customer ID) of the customer. The checkout apparatus reads article determination information related to the received feature value (or customer ID) from the registered article storage unit 60 and performs checkout processing by using the read information. The checkout apparatus subsequently generates an electronic receipt and transmits the electronic receipt to the customer terminal. Note that the checkout apparatus may be built into the article information deduction apparatus 10.

Note that the information to the effect that a checkout of the product is to be made may be input from a terminal installed in the store. In this case, the terminal may generate a feature value by capturing an image of the face of the customer and transmit the feature value to the checkout apparatus.

Further, when shelves 20 are installed in a distribution center or a pharmacy, a person taking out an article 200 can be checked by using information stored by the registered article storage unit 60.

Note that while the registered article storage unit 60 resides outside the article information deduction apparatus 10 in the example illustrated in FIG. 7, the registered article storage unit 60 may be part of the article information deduction apparatus 10. Further, for example, person determination information may be input by a person by using an input apparatus (such as a card reader) installed on the shelf 20.

The present example embodiment also improves determination precision of an article 200 taken out from a shelf 20, similarly to the first example embodiment. Further, the registered article storage unit 60 stores article determination information of an article 200 taken out by a person in association with person identification information of the person. Accordingly, who takes out which article 200 can be checked.

Third Example Embodiment

Functional Configuration Example

Figure 8:
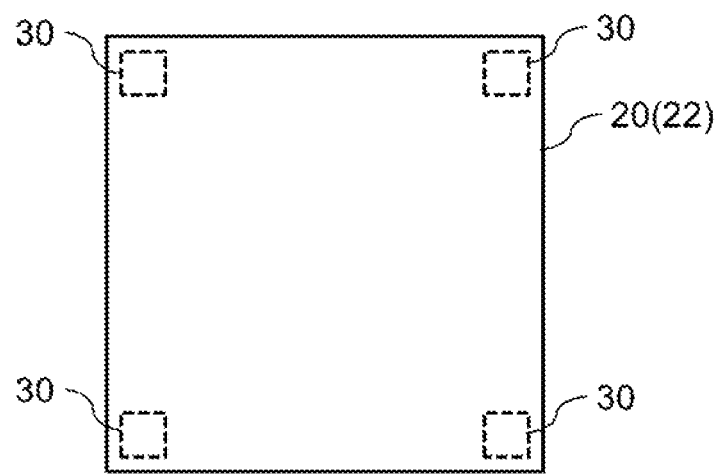
FIG. 8 is a plan view for illustrating a layout of weight sensors according to a third example embodiment.

FIG. 8 is a plan view for illustrating a layout of weight sensors 30 according to the present example embodiment. A plurality of weight sensors 30 according to the present example embodiment are provided separately from one another on one shelf 20 or in one partial area 22 (hereinafter described as on one shelf 20). In the example illustrated in the diagram, a shelf 20 is rectangular, and a weight sensor 30 is provided at each of the four corners of the shelf 20.

Then, weight change data used by an output unit 120 are based on changes in the detected values of the plurality of weight sensors 30. As an example, weight change data indicate changes in the detected values of the plurality of weight sensors 30 over time. Then, when changes in the detected values of the plurality of weight sensors 30 satisfy a criterion, the output unit 120 in an article information deduction apparatus 10 determines that an article 200 on the shelf 20 is taken out. For example, when the total value of decrements of the detected values of the plurality of weight sensors 30 satisfy a criterion, the output unit 120 determines that an article 200 is taken out. At this time, by using decrements of the detected values of the plurality of weight sensors 30, the output unit 120 determines the position in the shelf 20 at which an article 200 is taken out.

Note that pieces of weight sensor identification information of a plurality of weight sensors 30 provided on the same shelf 20 are associated with one another in a shelf space allocation information storage unit 130 and are managed as a set of weight sensors 30. For example, pieces of weight sensor identification information of a plurality of weight sensors 30 provided on the same shelf 20 are associated with information distinguishing the shelf 20 from another shelf 20, such as shelf position information. Therefore, by using information stored by the shelf space allocation information storage unit 130, the output unit 120 can perform the aforementioned processing.

Operation Example

The article information deduction apparatus 10 first determines a set of weight sensors changes in the detected values of which satisfy a criterion (Step S102 in FIG. 4). Next, by using the detection result of the determined set of weight sensors 30, the article information deduction apparatus 10 executes determination processing of an article (Step S104 in FIG. 4).

Figure 9:
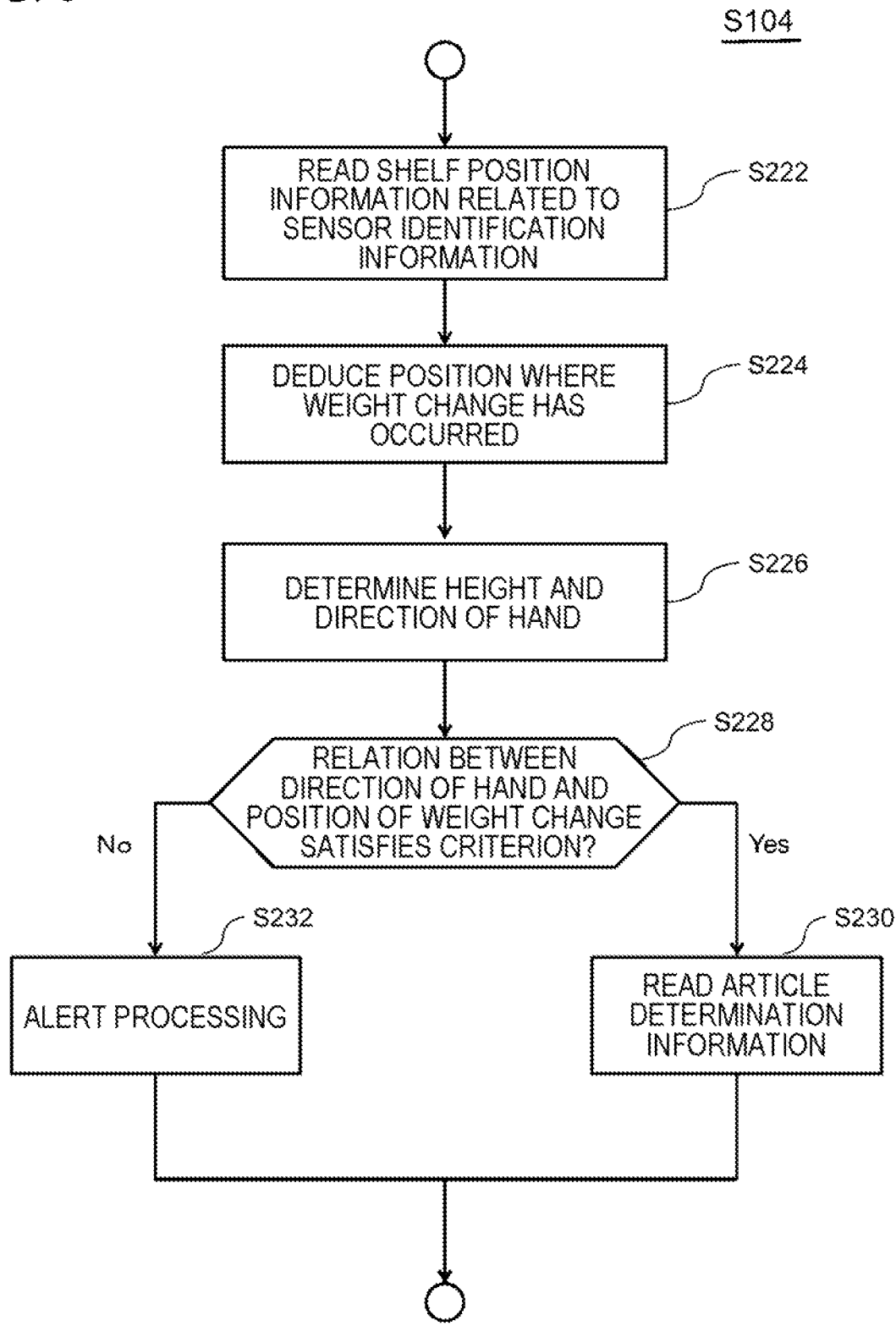
FIG. 9 is a flowchart for illustrating details of determination processing of an article (Step S104 in FIG. 4) in the third example embodiment.

FIG. 9 is a flowchart for illustrating details of the determination processing of an article (Step S104 in FIG. 4) according to the present example embodiment. First, the output unit 120 reads shelf position information related to weight sensor identification information of the weight sensors 30 determined in Step S102 (Step S222).

Next, by using changes in the detected values of the plurality of weight sensors 30, the output unit 120 deduces a position in the shelf 20 where a weight change has occurred, that is, a position where an article 200 being taken out has been placed. For example, the output unit 120 assumes a variation in each weight sensor 30 as a weight and deduces a position being the barycenter of the weights to be the position described above (Step S224).

Further, by using data transmitted from a depth sensor 40, the output unit 120 determines the height of a hand and determines the direction in which the hand extends. For example, when a depth sensor 40 outputs a depth map two-dimensionally indicating height information, the output unit 120 determines the height and direction of the hand by using the depth map (Step S226).

Then, the output unit 120 determines whether a relation between the height of the hand and the shelf position information satisfies a criterion and a relation between the direction of the hand and the position of the article 200 determined in Step S224 satisfies a criterion. The determination of whether a relation between the height of the hand and the shelf position information satisfies a criterion is similar to the determination described in Step S206 in FIG. 5. With regard to a relation between the direction of the hand and the position of the article 200, for example, when the direction of the hand overlaps the position of the article 200 or the shortest distance between the two is equal to or less than a reference value, the criterion is determined to be satisfied (Step S228).

Then, when the determination in Step S228 is Yes, the output unit 120 deduces the article 200 taken out by the person (Step S230). Processing performed in Step S230 is similar to the processing performed in Step S208 in FIG. 5. On the other hand, when the determination in Step S224 is No, the output unit 120 performs alert processing (Step S232). Processing performed in Step S232 is similar to the processing performed in Step S210 in FIG. 5.

The present example embodiment also improves determination precision of an article 200 taken out from a shelf 20, similarly to the first example embodiment. Further, the article information deduction apparatus 10 uses not only a relation between the height of a hand and shelf position information (that is, a relation in a height direction) but also a relation between the direction of the hand and the position of an article 200 (that is, a relation in a horizontal plane) in deduction of an article 200. Therefore, determination precision of an article 200 taken out from a shelf 20 is further improved.

Fourth Example Embodiment

Functional Configuration Example

Figure 10:
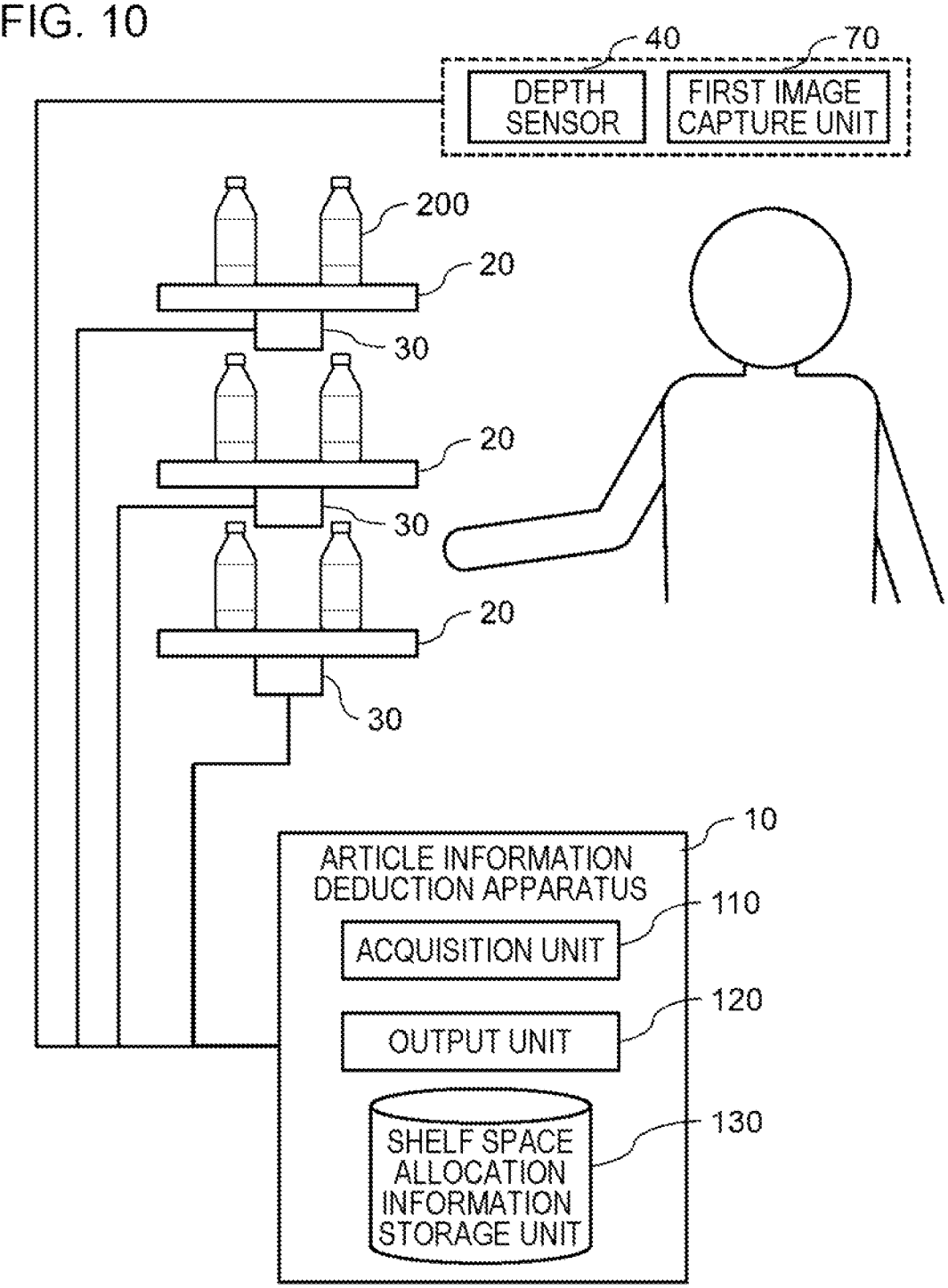
FIG. 10 is a diagram illustrating a functional configuration of an article information deduction apparatus according to a fourth example embodiment along with a use environment of the article information deduction apparatus.

FIG. 10 is a diagram illustrating a functional configuration of an article information deduction apparatus 10 according to the present example embodiment along with a use environment of the article information deduction apparatus 10. The article information deduction apparatus 10 according to the present example embodiment has a configuration similar to that of the article information deduction apparatus 10 according to any one of the first to third example embodiments except for repeatedly acquiring an image from a first image capture unit (hereinafter described as a first image) and determining an article 200 by using the first images. FIG. 10 illustrates a case similar to the first example embodiment.

An image capture area of the first image capture unit 70 includes at least part of a shelf-front space being a space in front of shelves 20. Therefore, a first image generated by the first image capture unit 70 includes at least part of the shelf-front space and includes an article 200 taken out from the shelf 20.

Then, an output unit 120 deduces the article 200 taken out from the shelf 20 by a person by using an image of the article 200 included in the first image. Specifically, a shelf space allocation information storage unit 130 stores a feature value of the article 200 in the image along with article determination information. Then, the output unit 120 deduces the article 200 by using a result of checking the feature value against the first image.

Operation Example

Processing performed by the article information deduction apparatus 10 illustrated in FIG. 10 is as described in the first example embodiment using FIG. 4. However, details of processing described in Step S104 differs from that in the first example embodiment.

Figure 11:
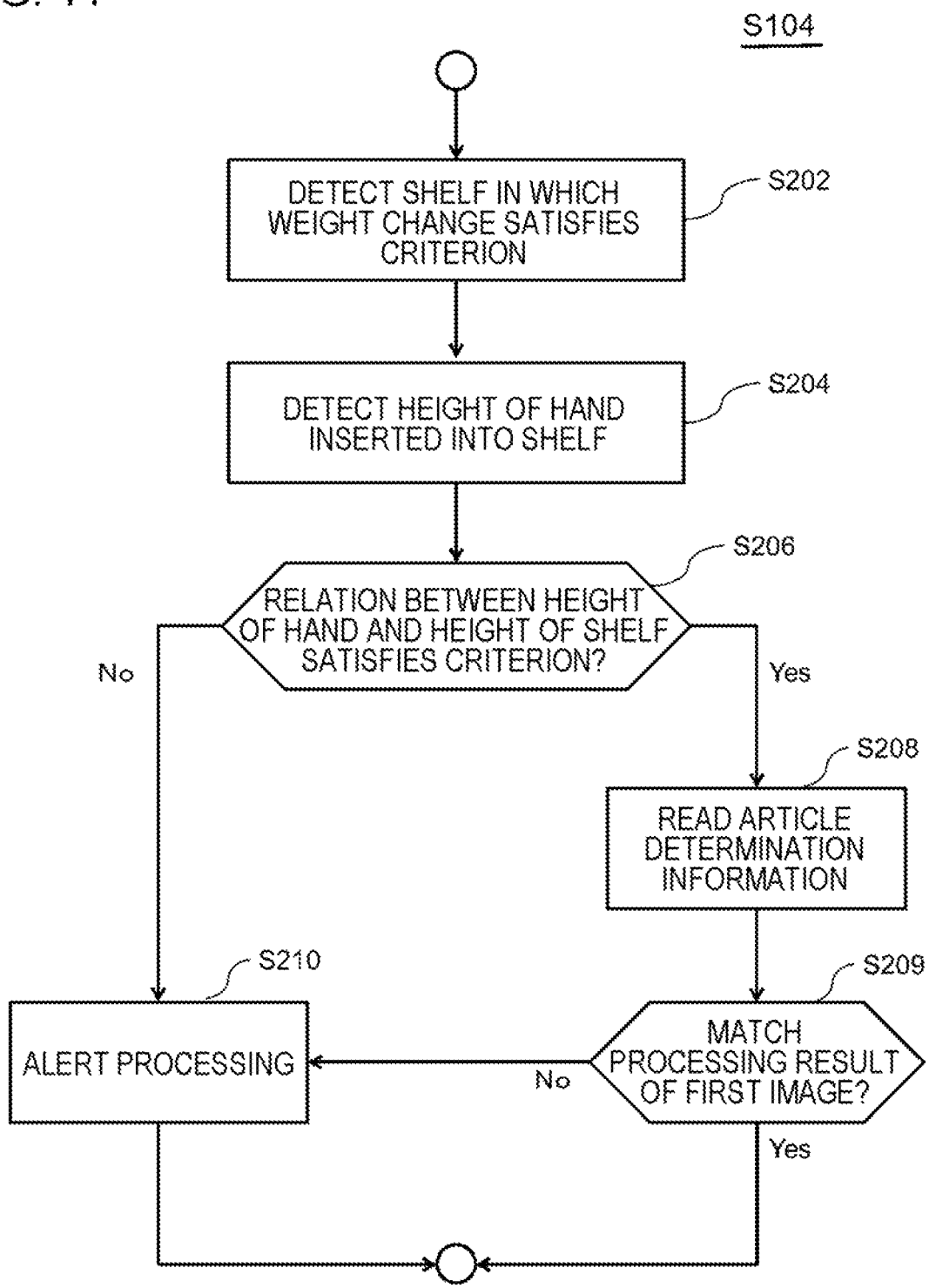
FIG. 11 is a flowchart for illustrating details of Step S104 in the fourth example embodiment.

FIG. 11 is a flowchart for illustrating details of Step S104 in the present example embodiment. Processing performed in Steps S202, S204, S206, S208, and S210 is as described using FIG. 5. However, the output unit 120 also reads a feature value of an article 200 along with article determination information in Step S208.

Then, the output unit 120 processes a first image captured within a reference time (such as 10 seconds) from a change in the detected value of a weight sensor 30 and extracts a feature value of an article 200 included in the first image. Then, when the extracted feature value matches the feature value read in Step S208, for example, when the score is equal to or greater than a reference value (Step S209: Yes), the output unit 120 outputs the article determination information read in Step S208 on an as-is basis. On the other hand, when the feature values do not match each other (Step S209: No), the output unit 120 performs the alert processing (Step S210).

Note that when the processing described above is applied to the article information deduction apparatus 10 described in the third example embodiment, the processing described in Step S209 is performed after Step S230 in FIG. 9.

The present example embodiment improves deduction precision of an article 200 taken out from a shelf 20 by a person, similarly to the first example embodiment. Further, a first image includes the article 200 taken out by the person. Then, the output unit 120 in the article information deduction apparatus 10 further verifies the article 200 deduced from the detected values of a depth sensor 40 and a weight sensor 30 by using the first image. Accordingly, deduction precision of an article 200 is further improved.

Fifth Example Embodiment

Functional Configuration Example

Figure 12:
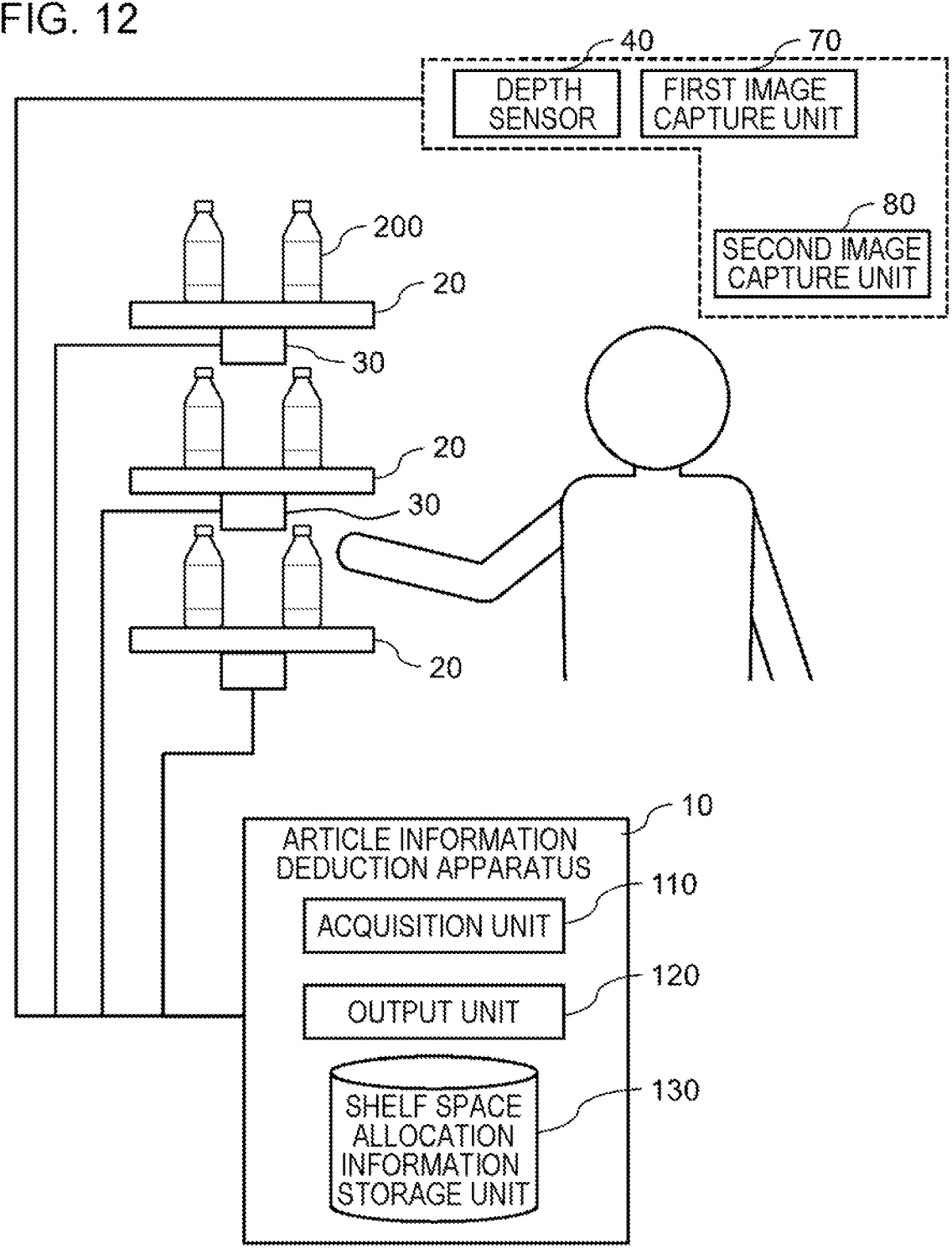
FIG. 12 is a diagram illustrating a functional configuration of an article information deduction apparatus according to a fifth example embodiment along with a use environment of the article information deduction apparatus.

FIG. 12 is a diagram illustrating a functional configuration of an article information deduction apparatus 10 according to the present example embodiment along with a use environment of the article information deduction apparatus 10. The article information deduction apparatus 10 according to the present example embodiment has a configuration similar to that of the article information deduction apparatus 10 according to any one of the first to fourth example embodiments except for repeatedly acquiring an image from a second image capture unit 80 (hereinafter described as a second image) and determining an article 200 by using the plurality of second images. FIG. 12 illustrates a case similar to the fourth example embodiment.

The second image capture unit 80 captures an image of a shelf 20 from the front (for example, from diagonally above the front). Therefore, a second image includes an article 200 placed on a shelf 20. Further, when the second image capture unit 80 captures an image of a shelf 20 from diagonally above the front, an image of an article 200 positioned deep inside the shelf 20 can also be captured. Then, an output unit 120 in the article information deduction apparatus 10 deduces an article 200 taken out from a shelf 20 by a person by further using a change in second images. Specifically, the output unit 120 deduces an article 200 by using the difference between a second image captured before a depth sensor 40 detects a hand of a person (in other words, before a person enters a shelf-front space) and a second image captured after the depth sensor 40 no longer detects the hand of the person (in other words, after the person leaves the shelf-front space).

Operation Example

Processing performed by the article information deduction apparatus 10 illustrated in FIG. 12 is as described in the first example embodiment using FIG. 4. However, details of the processing described in Step S104 differ from those in the first example embodiment.

Figure 13:
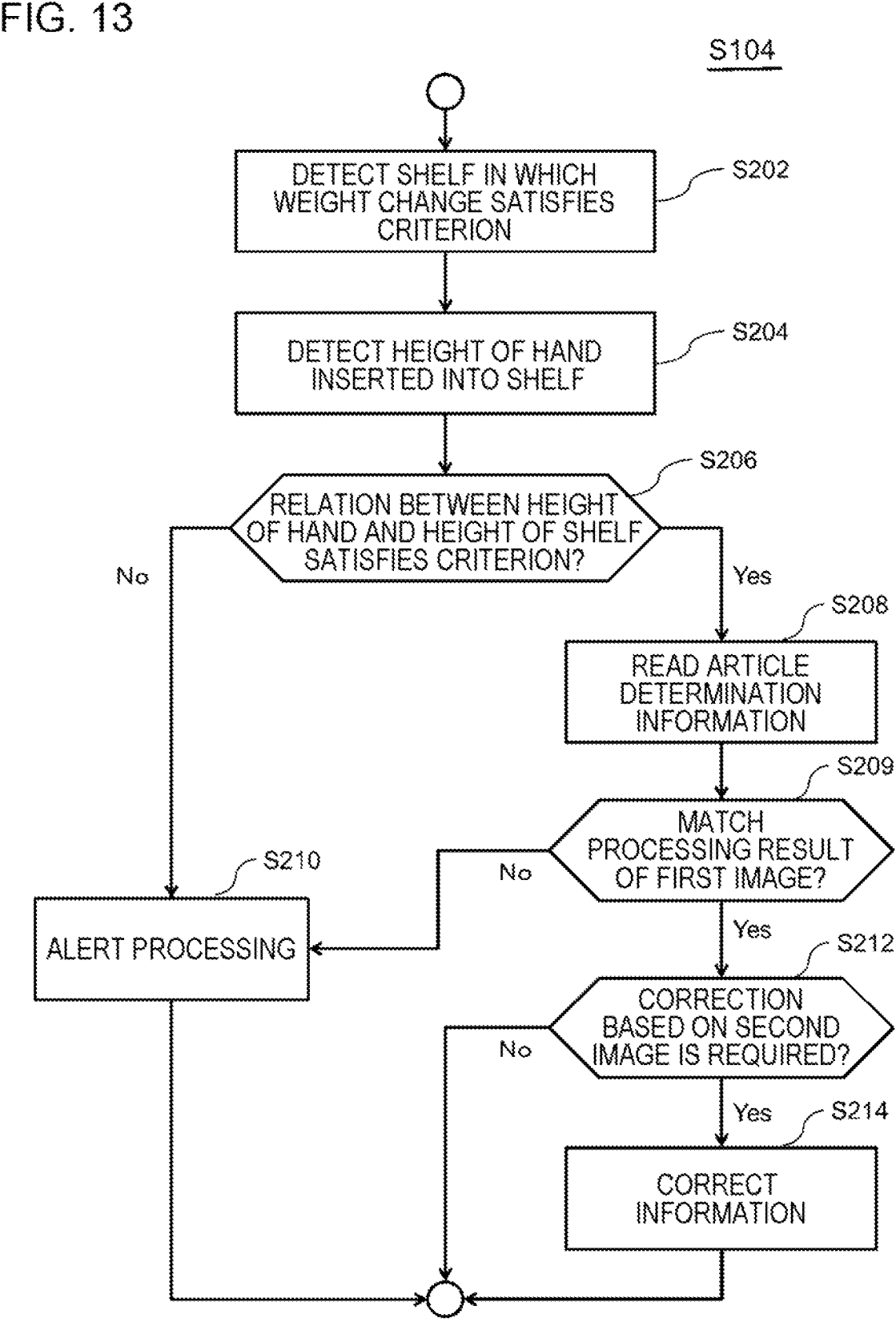
FIG. 13 is a flowchart for illustrating an operation example of the article information deduction apparatus according to the fifth example embodiment.

FIG. 13 is a flowchart for illustrating an operation example of the article information deduction apparatus 10 according to the present example embodiment. Processing performed in Steps S202, S204, S206, S208, S209, and S210 is as described using FIG. 11.

Then, when a feature value of an article 200 included in a first image matches a feature value of an article read from a shelf space allocation information storage unit 130 (Step S209: Yes), the output unit 120 in the article information deduction apparatus 10 processes a second image and determines whether a correction based on the second image to article determination information read in Step S208 is required (Step S212). When a correction is required (Step S212: Yes), the output unit 120 executes the correction (Step S214).

For example, the output unit 120 extracts the difference between a second image captured before the depth sensor 40 detects a hand of a person (in other words, before a person enters a shelf-front space) and a second image captured after the depth sensor 40 no longer detects the hand of the person (in other words, after the person leaves the shelf-front space) and, by performing matching processing on the difference, determines whether an article 200 related to the article determination information read in Step S208 is moved to a shelf 20 different from a shelf 20 in which the article 200 should primarily reside. In the processing, the position of the article 200 after the movement is determined by, for example, matching processing using a feature value of the article 200. Then, when the movement is detected (Step S212: Yes), the output unit 120 does not output the article determination information. For example, when this function is added to the second example embodiment, the registered article storage unit 60 does not store the article determination information of the article 200 (Step S214).

In addition, for each movement pattern of an article 200 by a person, the output unit 120 previously stores a combination of a detection result of a weight sensor 30, a detection result of the depth sensor 40, and a processing result of a second image. Then, when a result corresponding to a combination is detected, the output unit 120 deduces that a movement pattern related to the combination has occurred.

On the other hand, when a correction is not required (Step S212: No), the output unit 120 outputs the article determination information read in Step S208.

Then, for example, the article determination information is used for checkout processing of a product in the store, as described in the second example embodiment.

The present example embodiment improves deduction precision of an article 200 taken out from a shelf 20 by a person, similarly to the first example embodiment. Further, the output unit 120 in the article information deduction apparatus 10 determines an article 200 moved within shelves 20. Therefore, when there is an article 200 moved within shelves 20 by a person, false recognition that the person has taken out the article 200 can be restrained.

While the example embodiments of the present invention have been described above with reference to the drawings, the drawings are exemplifications of the present invention, and various configurations other than those described above may be employed.

Further, while a plurality of processes (processing) are described in a sequential order in each of a plurality of flowcharts used in the aforementioned description, an execution order of processes executed in each example embodiment is not limited to the described order. An order of the illustrated processes may be modified without affecting the contents in each example embodiment. Further, the aforementioned example embodiments may be combined without contradicting one another.

The aforementioned example embodiments may also be described in whole or in part as the following supplementary notes but are not limited thereto.

1. An article deduction apparatus including:
    an acquisition unit that acquires weight change data being data based on a change in a detected value of a weight sensor provided on a shelf on which a plurality of articles can be placed and movement data indicating a movement of a hand of a person positioned in a shelf-front space being a space in front of the shelf; and
    an output unit that outputs article determination information of the article deduced to be taken out by the hand, by using the weight change data and the movement data.

2. The article deduction apparatus according to aforementioned 1, wherein
    the acquisition unit generates the movement data by using a detected value of a depth sensor a detection range of which includes the shelf-front space, and,
    when a relation between a height of a shelf in which a change in a detected value of the weight sensor has occurred and a detected value of a depth sensor that can acquire the movement data satisfies a criterion, the output unit outputs the article determination information associated with the shelf 3. The article deduction apparatus according to aforementioned 2, wherein
    a plurality of shelves with different heights exist,
    at least one piece of the article determination information is associated with each of the plurality of shelves, and
    the weight change data indicate a variation in a weight for each of the plurality of shelves.

4. The article deduction apparatus according to any one of aforementioned 1 to 3, wherein
    the output unit outputs the article determination information associated with, out of a plurality of partial areas of the shelf, the partial area in which a change in a weight satisfies a criterion.

5. The article deduction apparatus according to any one of aforementioned 1 to 4, further including
    a storage processing unit that causes a storage to store the article determination information output by the output unit in association with person determination information for determining the person.

6. The article deduction apparatus according to aforementioned 5, wherein
    the storage processing unit acquires the person determination information from a person tracking apparatus tracking a movement of the person.

7. The article deduction apparatus according to any one of aforementioned 1 to 6, wherein
    the acquisition unit repeatedly acquires a first image being an image including at least part of the shelf-front space, and
    the output unit deduces the article taken out by the hand, by further using an image of the article included in the first image.

8. The article deduction apparatus according to any one of aforementioned 2 to 6, wherein
    the acquisition unit repeatedly acquires a second image being an image of the shelf captured from a front, and
    the output unit determines the article determination information of the article taken out by the hand, by further using a change in the second image.

9. The article deduction apparatus according to any one of aforementioned 1 to 8, wherein
    a plurality of weight sensors are provided separately from one another on the shelf, and
    the acquisition unit generates the weight change data by using detected values of the plurality of weight sensors.

10. The article deduction apparatus according to any one of aforementioned 1 to 9, wherein
    the shelf is installed in a store,
    the person is a customer, and
    the article deduction apparatus further includes:
        a checkout processing unit that performs checkout processing by using the article determination information output by the output unit; and an electronic receipt output unit that outputs an electronic receipt based on the checkout processing.

11. An article deduction method including, by a computer:
acquiring weight change data being data based on a change in a detected value of a weight sensor provided on a shelf on which a plurality of articles can be placed and movement data indicating a movement of a hand of a person positioned in a shelf-front space being a space in front of the shelf; and
outputting article determination information of the article deduced to be taken out by the hand, by using the weight change data and the movement data.

12. The article deduction method according to aforementioned 11, further including, by the computer:
generating the movement data by using a detected value of a depth sensor a detection range of which includes the shelf-front space; and,
when a relation between a height of a shelf in which a change in a detected value of the weight sensor has occurred and a detected value of a depth sensor that can acquire the movement data satisfies a criterion, outputting the article determination information associated with the shelf 13. The article deduction method according to aforementioned 12, wherein
a plurality of shelves with different heights exist,
at least one piece of the article determination information is associated with each of the plurality of shelves, and
the weight change data indicate a variation in a weight for each of the plurality of shelves.

14. The article deduction method according to any one of aforementioned 11 to 13, further including, by the computer,
outputting the article determination information associated with, out of a plurality of partial areas of the shelf, the partial area in which a change in a weight satisfies a criterion.

15. The article deduction method according to any one of aforementioned 11 to 14, further including, by the computer,
causing a storage to store the output article determination information in association with person determination information for determining the person.

16. The article deduction method according to aforementioned 15, further including, by the computer,
acquiring the person determination information from a person tracking apparatus tracking a movement of the person.

17. The article deduction method according to any one of aforementioned 11 to 16, further including, by the computer:
repeatedly acquiring a first image being an image including at least part of the shelf-front space; and
deducing the article taken out by the hand, by further using an image of the article included in the first image.

18. The article deduction method according to any one of aforementioned 12 to 16, further including, by the computer,
repeatedly acquiring a second image being an image of the shelf captured from a front and determining the article determination information of the article taken out by the hand, by further using a change in the second image.

19. The article deduction method according to any one of aforementioned 11 to 18, wherein
a plurality of weight sensors are provided separately from one another on the shelf, and
the method further includes, by the computer,
generating the weight change data by using detected values of the plurality of weight sensors.

20. The article deduction method according to any one of aforementioned 11 to 19, wherein
the shelf is installed in a store,
the person is a customer, and
the method further includes, by the computer,
performing checkout processing by using the output article determination information and outputting an electronic receipt based on the checkout processing.

21. A program causing a computer to have:
a function of acquiring weight change data being data based on a change in a detected value of a weight sensor provided on a shelf on which a plurality of articles can be placed and movement data indicating a movement of a hand of a person positioned in a shelf-front space being a space in front of the shelf; and
a function of outputting article determination information of the article deduced to be taken out by the hand, by using the weight change data and the movement data.

22. The program according to aforementioned 21, further causing the computer to have:
a function of generating the movement data by using a detected value of a depth sensor a detection range of which includes the shelf-front space; and
a function of, when a relation between a height of a shelf in which a change in a detected value of the weight sensor has occurred and a detected value of a depth sensor that can acquire the movement data satisfies a criterion, outputting the article determination information associated with the shelf 23. The program according to aforementioned 22, wherein
a plurality of shelves with different heights exist,
at least one piece of the article determination information is associated with each of the plurality of shelves, and
the weight change data indicate a variation in a weight for each of the plurality of shelves.

24. The program according to any one of aforementioned 21 to 23, further causing the computer to have
a function of outputting the article determination information associated with, out of a plurality of partial areas of the shelf, the partial area in which a change in a weight satisfies a criterion.

25. The program according to any one of aforementioned 21 to 24, further causing the computer to have
a function of causing a storage to store the output article determination information in association with person determination information for determining the person.

26. The program according to aforementioned 25, further causing the computer to have
a function of acquiring the person determination information from a person tracking apparatus tracking a movement of the person.

27. The program according to any one of aforementioned 21 to 26, further causing the computer to have:

a function of repeatedly acquiring a first image being an image including at least part of the shelf-front space; and a function of deducing the article taken out by the hand, by further using an image of the article included in the first image.

28. The program according to any one of aforementioned 22 to 26, further causing the computer to have
a function of repeatedly acquiring a second image being an image of the shelf captured from a front and determining the article determination information of the article taken out by the hand, by further using a change in the second image.

29. The program according to any one of aforementioned 21 to 28, wherein
a plurality of weight sensors are provided separately from one another on the shelf, and
the program further causes the computer to have
a function of generating the weight change data by using detected values of the plurality of weight sensors.

30. The program according to any one of aforementioned 21 to 29, wherein
the shelf is installed in a store,
the person is a customer, and
the program further causes the computer to have
a function of performing checkout processing by using the output article determination information and outputting an electronic receipt based on the checkout processing.

This application claims priority based on Japanese Patent Application No. 2019-037829 filed on Mar. 1, 2019, the disclosure of which is hereby incorporated by reference thereto in its entirety.

The invention claimed is:

1. An article deduction apparatus comprising:
a memory storing instructions; and
a processor configured to execute the instructions to:
acquire weight change data being data based on a change in a detected value of a weight sensor provided on a shelf on which a plurality of articles can be placed and movement data indicating a movement of a hand of a person positioned in a shelf-front space being a space in front of the shelf;
output article determination information of the article deduced to be taken out by the hand, by using the weight change data and the movement data; and
cause a storage to store the article determination information in association with person determination information for determining the person, wherein the person determination information is a feature value of the face acquired from an image of a person.

2. The article deduction apparatus according to claim 1, wherein the processor is further configured to execute the instructions to:
generate the movement data by using a detected value of a depth sensor a detection range of which includes the shelf-front space; and
when a relation between a height of a shelf in which a change in a detected value of the weight sensor has occurred and a detected value of a depth sensor that can acquire the movement data satisfies a criterion, output the article determination information associated with the shelf.

3. The article deduction apparatus according to claim 2, wherein
a plurality of shelves with different heights exist,
at least one piece of the article determination information is associated with each of the plurality of shelves, and
the weight change data indicate a variation in a weight for each of the plurality of shelves.

4. The article deduction apparatus according to claim 1, wherein
the processor is further configured to execute the instructions to output the article determination information associated with, out of a plurality of partial areas of the shelf, the partial area in which a change in a weight satisfies a criterion.

5. The article deduction apparatus according to claim 1, wherein
the processor is further configured to execute the instructions to acquire the person determination information from a person tracking apparatus tracking a movement of the person.

6. The article deduction apparatus according to claim 1, wherein the processor is further configured to execute the instructions to:
repeatedly acquire a first image being an image including at least part of the shelf-front space; and
deduce the article taken out by the hand, by further using an image of the article included in the first image.

7. The article deduction apparatus according to claim 2, wherein the processor is further configured to execute the instructions to:
repeatedly acquire a second image being an image of the shelf captured from a front; and
determine the article determination information of the article taken out by the hand, by further using a change in the second image.

8. The article deduction apparatus according to claim 1, wherein
a plurality of weight sensors are provided separately from one another on the shelf, and the processor is further configured to execute the instructions to generate the weight change data by using detected values of the plurality of weight sensors.

9. The article deduction apparatus according to claim 1, wherein
the shelf is installed in a store,
the person is a customer, and
the processor is further configured to execute the instructions to:
perform checkout processing by using the article determination information; and
output an electronic receipt based on the checkout processing.

10. An article deduction method comprising, by a computer:
acquiring weight change data being data based on a change in a detected value of a weight sensor provided on a shelf on which a plurality of articles can be placed and movement data indicating a movement of a hand of a person positioned in a shelf-front space being a space in front of the shelf;
outputting article determination information of the article deduced to be taken out by the hand, by using the weight change data and the movement data; and
causing a storage to store the article determination information in association with person determination information for determining the person, wherein the person determination information is a feature value of the face acquired from an image of a person.

11. The article deduction method according to claim 10, further comprising:

generating the movement data by using a detected value of a depth sensor a detection range of which includes the shelf-front space; and when a relation between a height of a shelf in which a change in a detected value of the weight sensor has occurred and a detected value of a depth sensor that can acquire the movement data satisfies a criterion, outputting the article determination information associated with the shelf.

12. The article deduction method according to claim 10, further comprising outputting the article determination information associated with, out of a plurality of partial areas of the shelf, the partial area in which a change in a weight satisfies a criterion.

13. The article deduction method according to claim 10, further comprising acquiring the person determination information from a person tracking apparatus tracking a movement of the person.

14. The article deduction method according to claim 10, further comprising:

repeatedly acquiring a first image being an image including at least part of the shelf-front space; and deducing the article taken out by the hand, by further using an image of the article included in the first image.

15. The article deduction method according to claim 10, wherein a plurality of weight sensors are provided separately from one another on the shelf, and the method further comprises generating the weight change data by using detected values of the plurality of weight sensors.

16. A non-transitory computer-readable medium storing a program for causing a computer to perform operations, the operations comprising:

acquiring weight change data being data based on a change in a detected value of a weight sensor provided on a shelf on which a plurality of articles can be placed and movement data indicating a movement of a hand of a person positioned in a shelf-front space being a space in front of the shelf;

outputting article determination information of the article deduced to be taken out by the hand, by using the weight change data and the movement data; and causing a storage to store the article determination information in association with person determination information for determining the person, wherein the person determination information is a feature value of the face acquired from an image of a person.

17. The non-transitory computer-readable medium according to claim 16, wherein the operations further comprise:

generating the movement data by using a detected value of a depth sensor a detection range of which includes the shelf-front space; and, when a relation between a height of a shelf in which a change in a detected value of the weight sensor has occurred and a detected value of a depth sensor that can acquire the movement data satisfies a criterion, outputting the article determination information associated with the shelf.

18. The non-transitory computer-readable medium according to claim 16, wherein the operations further comprise outputting the article determination information associated with, out of a plurality of partial areas of the shelf, the partial area in which a change in a weight satisfies a criterion.

19. The non-transitory computer-readable medium according to claim 16, wherein the operations further comprise acquiring the person determination information from a person tracking apparatus tracking a movement of the person.

20. The non-transitory computer-readable medium according to claim 16, wherein the operations further comprise:

repeatedly acquiring a first image being an image including at least part of the shelf-front space; and deducing the article taken out by the hand, by further using an image of the article included in the first image.

* * * * *